US008200763B2

(12) United States Patent
Quoc et al.

(10) Patent No.: US 8,200,763 B2
(45) Date of Patent: Jun. 12, 2012

(54) ENABLING DISPLAY OF A RECIPIENT LIST FOR A GROUP TEXT MESSAGE

(75) Inventors: Michael Quoc, San Francisco, CA (US); Dan Wascovich, San Francisco, CA (US); Matthew Fukuda, San Francisco, CA (US); E. Stanley Ott, IV, Palo Alto, CA (US); Edward Ho, San Jose, CA (US); Jonathan James Trevor, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1072 days.

(21) Appl. No.: 11/562,827

(22) Filed: Nov. 22, 2006

(65) Prior Publication Data

US 2008/0120410 A1 May 22, 2008

(51) Int. Cl.
*G06F 15/173* (2006.01)
(52) U.S. Cl. ........................................ 709/206; 709/225
(58) Field of Classification Search .................. 709/225, 709/206
See application file for complete search history.

(56) References Cited

U.S. PATENT DOCUMENTS

| | | | | |
|---|---|---|---|---|
| 6,201,814 | B1 * | 3/2001 | Greenspan | 370/428 |
| 6,775,689 | B1 * | 8/2004 | Raghunandan | 709/206 |
| 7,047,030 | B2 | 5/2006 | Forsyth | |
| 7,111,044 | B2 | 9/2006 | Lee | |
| 7,184,790 | B2 | 2/2007 | Dorenbosch et al. | |
| 7,319,882 | B2 | 1/2008 | Mendiola et al. | |
| 7,516,411 | B2 | 4/2009 | Beaton et al. | |
| 2002/0091773 | A1 * | 7/2002 | Chowdhry et al. | 709/206 |
| 2003/0153341 | A1 | 8/2003 | Crockett et al. | |
| 2003/0212680 | A1 * | 11/2003 | Bates et al. | 707/7 |
| 2004/0001446 | A1 | 1/2004 | Bhatia et al. | |

(Continued)

FOREIGN PATENT DOCUMENTS

WO    WO 2004/095806 A2 * 11/2004

(Continued)

OTHER PUBLICATIONS

Häkkilä, J. et al., User experiences on combining location sensitive mobile phone applications and multimedia messaging. In Proceedings of the 3rd international Conference on Mobile and Ubiquitous Multimedia (College Park, Maryland, Oct. 27-29, 2004). MUM '04, vol. 83. ACM, New York, NY, 179-185.*

(Continued)

*Primary Examiner* — Wing Chan
*Assistant Examiner* — Kostas Katsikis
(74) *Attorney, Agent, or Firm* — Frommer Lawrence & Haug LLP; Jamie L. Wiegand

(57) ABSTRACT

A device, system, and method are directed towards providing a recipient list for a message to be communicated within a group associated with an event. A recipient list for the message is defined based on identities of a plurality of members in the group. Ordering information for the recipient list is determined based on at least one characteristic of the event. Additional ordering information may also be determined based on other characteristics of other events. The recipient list is ordered based on the determined ordering information(s). The ordered recipient list is truncated if a length of the recipient list exceeds a first threshold. A selectable option to retrieve the (truncated) recipient list is provided with the message, if a length of the message plus a length if of the (truncated) recipient list exceeds a second threshold. Otherwise, the (truncated) recipient list is provided with the message.

16 Claims, 8 Drawing Sheets

U.S. PATENT DOCUMENTS

| | | | |
|---|---|---|---|
| 2004/0034591 A1* | 2/2004 | Waelbroeck et al. | 705/37 |
| 2004/0034723 A1 | 2/2004 | Giroti | |
| 2004/0135816 A1* | 7/2004 | Schwartz et al. | 345/811 |
| 2004/0199580 A1 | 10/2004 | Zhakov et al. | |
| 2004/0219936 A1* | 11/2004 | Kontiainen | 455/466 |
| 2005/0021624 A1 | 1/2005 | Herf et al. | |
| 2005/0034079 A1 | 2/2005 | Gunasekar et al. | |
| 2005/0081059 A1* | 4/2005 | Bandini et al. | 713/201 |
| 2005/0143106 A1 | 6/2005 | Chan et al. | |
| 2005/0174975 A1* | 8/2005 | Mgrdechian et al. | 370/338 |
| 2005/0209914 A1* | 9/2005 | Nguyen et al. | 705/14 |
| 2005/0212659 A1* | 9/2005 | Sauer | 340/7.46 |
| 2005/0216848 A1 | 9/2005 | Thompson et al. | |
| 2006/0067250 A1 | 3/2006 | Boyer et al. | |
| 2006/0068818 A1 | 3/2006 | Leitersdorf et al. | |
| 2006/0123082 A1 | 6/2006 | Digate et al. | |
| 2006/0195531 A1* | 8/2006 | Braun et al. | 709/206 |
| 2006/0242234 A1 | 10/2006 | Counts et al. | |
| 2006/0270419 A1* | 11/2006 | Crowley et al. | 455/456.2 |
| 2007/0022003 A1* | 1/2007 | Chao et al. | 705/14 |
| 2007/0255807 A1 | 11/2007 | Hayashi et al. | |
| 2007/0276846 A1* | 11/2007 | Ramanathan et al. | 707/100 |
| 2008/0045236 A1 | 2/2008 | Nahon et al. | |
| 2008/0071867 A1* | 3/2008 | Pearson et al. | 709/206 |
| 2008/0186926 A1 | 8/2008 | Baio et al. | |

FOREIGN PATENT DOCUMENTS

| | | | |
|---|---|---|---|
| WO | 2005114970 A2 | 1/2005 | |

OTHER PUBLICATIONS http://web.archive.org/web/20051124040614/http://www.m-w.com/dictionary/event.* http://www.credoreference.com/entry/hmdictenglang/event.*

Federated search, http://en.wikipedia.org/wiki/Federated_search (last visited May 15, 2007) (3 pages).

Crowley, Dennis P. et al., U.S. Appl. 60/570,410, filed May 12, 2004 entitled "Location-Based Social Software for Mobile Devices", (18 pages).

International Search Report and Written Opinion for International Applicaion No. PCT/US2008/050234, mailed on Apr. 23, 2008, 9 pages.

U.S. Appl. No. 11/670,400 Official Communication mailed Aug. 11, 2009, 17 pages.

International Preliminary Report on Patentability for International Patent Application No. PCT/US2008/050234 mailed Aug. 13, 2009.

Official Communication for Taiwanese Patent Application No. 97100810 issued Sep. 6, 2011.

Office Communication for U.S. Appl. No. 11/670,400 mailed Feb. 4, 2010.

Office Communication for U.S. Appl. No. 11/670,400 mailed Oct. 25, 2010.

Office Communication for U.S. Appl. No. 11/670,400 mailed Apr. 28, 2011.

* cited by examiner

— 800

| Member | Event Time | Event Location | Event Name | Messages Sent By Member | |
|---|---|---|---|---|---|
| Mike | 7:00pm | John's Place | Drinks | 8 | 862 |
| 807 | 820 | ... 830 | 840 | 853 | |
| Matt | Friday, 6:00pm-7:30pm | | Poker | 9 | 863 |
| 808 | 821 | ... | 841 | 854 | |
| John | Wednesday, 5:00pm-6:00pm | | Book-Club | 2 | 864 |
| 809 | 822 | ... | 842 | 855 | |
| John | 7:00pm | John's Place | Drinks | 5 | 865 |
| 810 | 823 | ... 831 | 843 | 856 | |

*FIG. 8*

ENABLING DISPLAY OF A RECIPIENT LIST FOR A GROUP TEXT MESSAGE

TECHNICAL FIELD

The present invention relates generally to mobile communications and, more particularly, but not exclusively to providing a list identifying recipients of a message.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, and enabling us to form partnerships with more people in more ways than ever before.

One aspect of our everyday lives that may benefit from online social networking technology involves the aspect that social gatherings may often occur in a less than organized, impromptu fashion. For example, people may decide, online to get together at some restaurant, club, or the like, almost immediately. Some social gatherings, while known by some members of a social network may be unknown by others, until so informed that the social event is occurring.

People may manage communications about such social gatherings by sending messages to each other over mobile devices. However, because of limitations in mobile technology, the messages may not include a list of recipients of such messages. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 shows one embodiment of a datastore for storing event characteristics.

DETAILED DESCRIPTION

Figure 1:
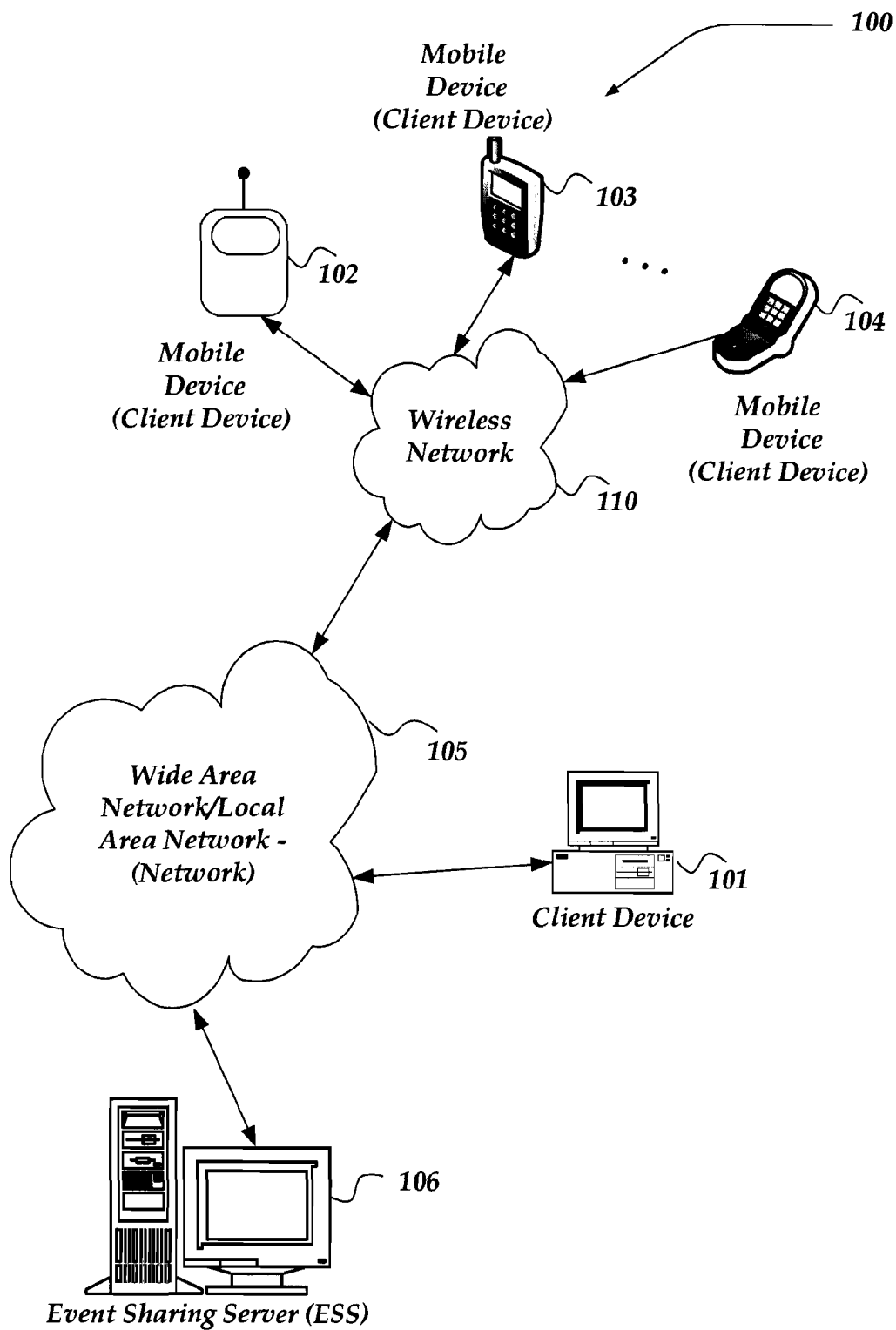
FIG. 1 shows components of an environment in which one or more embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, a social event, such as a party, meeting event, or the like.

As used herein, the term "event" refers to any physical social gathering of people, having a start time and an end time. In one embodiment, the start, and/or end times may be loosely established, in that they may occur informally, such as might arise based on an informal gathering of people. In another embodiment, the event may have established start and/or end times. Moreover, in one embodiment, the event may have multiple start/end times, such as might occur with a regularly scheduled meeting, or the like. As used herein the term "event characteristic" refers to any information associated with an event, including the event's time of creation, the event's duration, the event's location, the event's name, an amount of communication by the at least one member, a time a member joined the event, or the like.

As used herein, the term "member" refers to a user who is included in any collection. The term "group" refers to a collection of members who are participating in an event. As such the term "member of an event" refers a member of a group associated with the event.

The term "recipient list" refers to a grouping of one member of a grouping of members who are intended to receive a message. A recipient list may be a Carbon Copy (CC) list, or the like.

The term "content" refers to any digital data directed towards a user of a computing device, including, but not limited to audio data, multimedia data, photographs, video data, still images, text, graphics, animation files, voice messages, text messages, or the like.

The terms "ID," "user ID," or "identity" refers to an identifier for a member. The identifier may include any information useable in identifying the member, including an alphanumeric string, picture, sound, movie clip, or the like.

The term "aggregate amount" refers to a sum, product, or some other accumulation of values. The term "average aggregate amount" refers to an average across the aggregate amount, based on for example, a simple average, weighted average, or any other averaging function.

Briefly stated the various embodiments are directed towards providing a recipient list for a message to be communicated within a group associated with an event. The message is received at a server. A recipient list for the message is defined based on identities of a plurality of members in the group. Ordering information for the recipient list is determined based on at least one characteristic of the event. Additional ordering information may also be determined based on other characteristics of other events. The recipient list may be ordered based on the determined ordering information and/or the additional ordering information. The ordered recipient list may be truncated if a length of the recipient list exceeds a first threshold. If a length of the message plus a length of the (truncated) recipient list exceeds a second threshold, a selectable option to retrieve the (truncated) recipient list may be provided with the message. Otherwise, the (truncated) recipient list may be provided with the message. The message is sent to a plurality of client devices, wherein each of the plurality of client devices is associated with a different one of the members of the group.

Illustrative Operating Environment

FIG. 1 shows components of an environment in which one or more embodiments of the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Event Sharing Server (ESS) 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to ESS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as ESS 106, client device 101, each other, or the like. However, the present invention is not limited to these message protocols, and virtually any other message protocol may be employed. For example, the client application may enable a user to interact with the browser application, email application, VoIP applications, or the like.

Mobile devices 102-104 may further be configured to include a client application that enables the end-user to log into an end-user account that may be managed by another computing device, such as ESS 106. Such end-user account, for example, may be configured to enable the end-user to receive emails, send/receive IM messages, SMS messages, access selected web pages, participate in a social networking event, or the like. However, participation in various social networking events may also be performed without logging into the end-user account.

In addition, mobile devices 102-104 may include another application that is configured to enable the mobile user to share and/or receive content, and to display the content. In one embodiment, each of mobile devices 102-104 may share with and/or receive the content from ESS 106 and/or from another one of mobile devices 102-104. For example, content may be shared between the mobile devices using MMS, WAP, or the like. In one embodiment, a mobile device may receive a message indicating the content is available for viewing and/or annotating at a website, or the like.

In conjunction with sharing content, mobile devices 102-104 may enable an interaction with each other, through sharing various messages, and generally participating in a variety of integrated social experiences beyond merely voice communications. In one embodiment, mobile devices 102-104 may enable the interaction with a user associated with an event. For example, a user of one of mobile devices 102-104 may create a group that includes identified members. In one embodiment, members of the group may elect to share content, such as photographs, video clips, audio clips, text messages, emails, or the like, with other members of the group. Moreover, mobile devices 102-104 may enable any of the members of the group to also add other members to the group.

Figure 6:
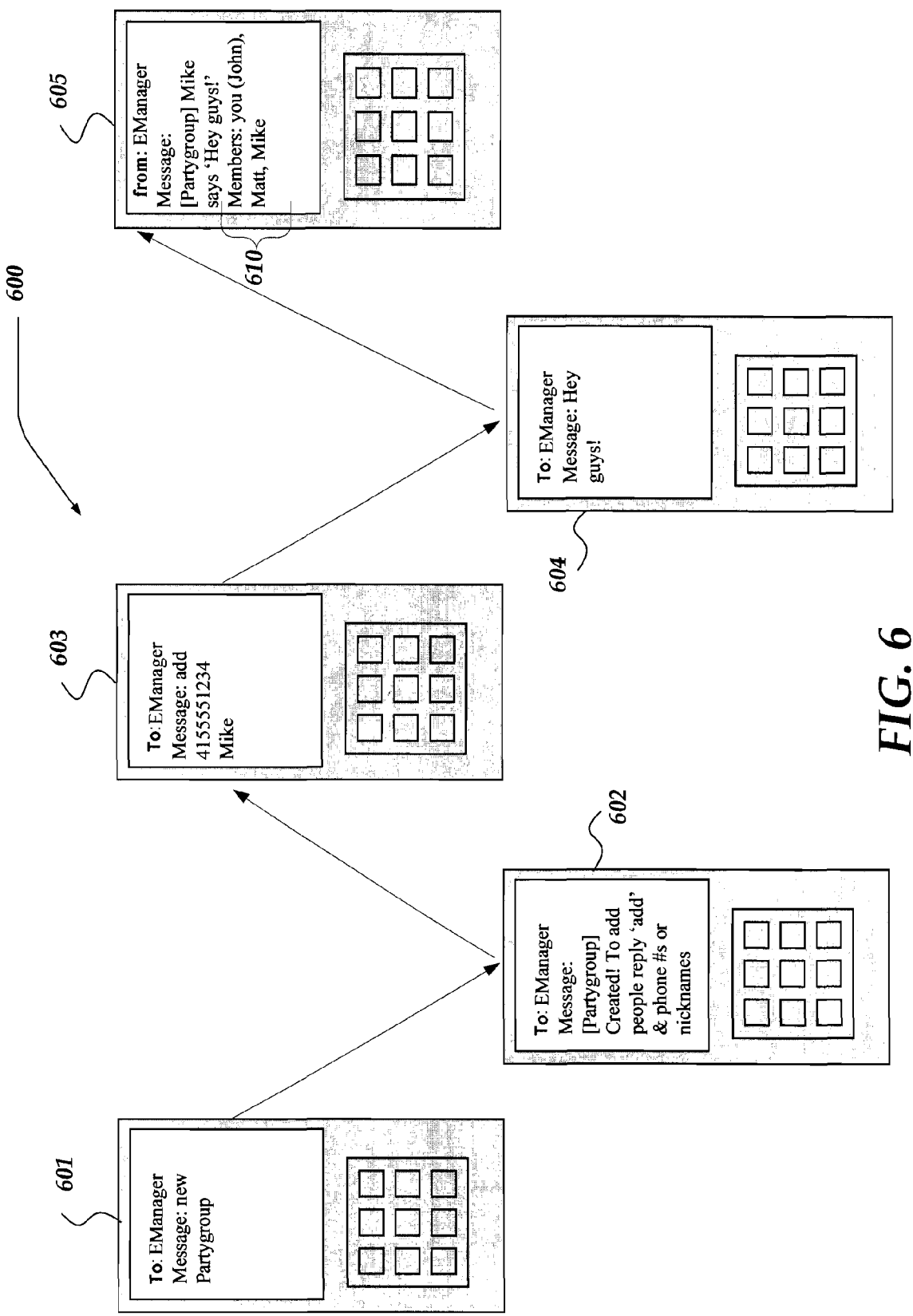
FIG. 6 shows one embodiment of a use case illustrating receiving a recipient list within a message sent to members of a group associated with an event.
Figure 7:
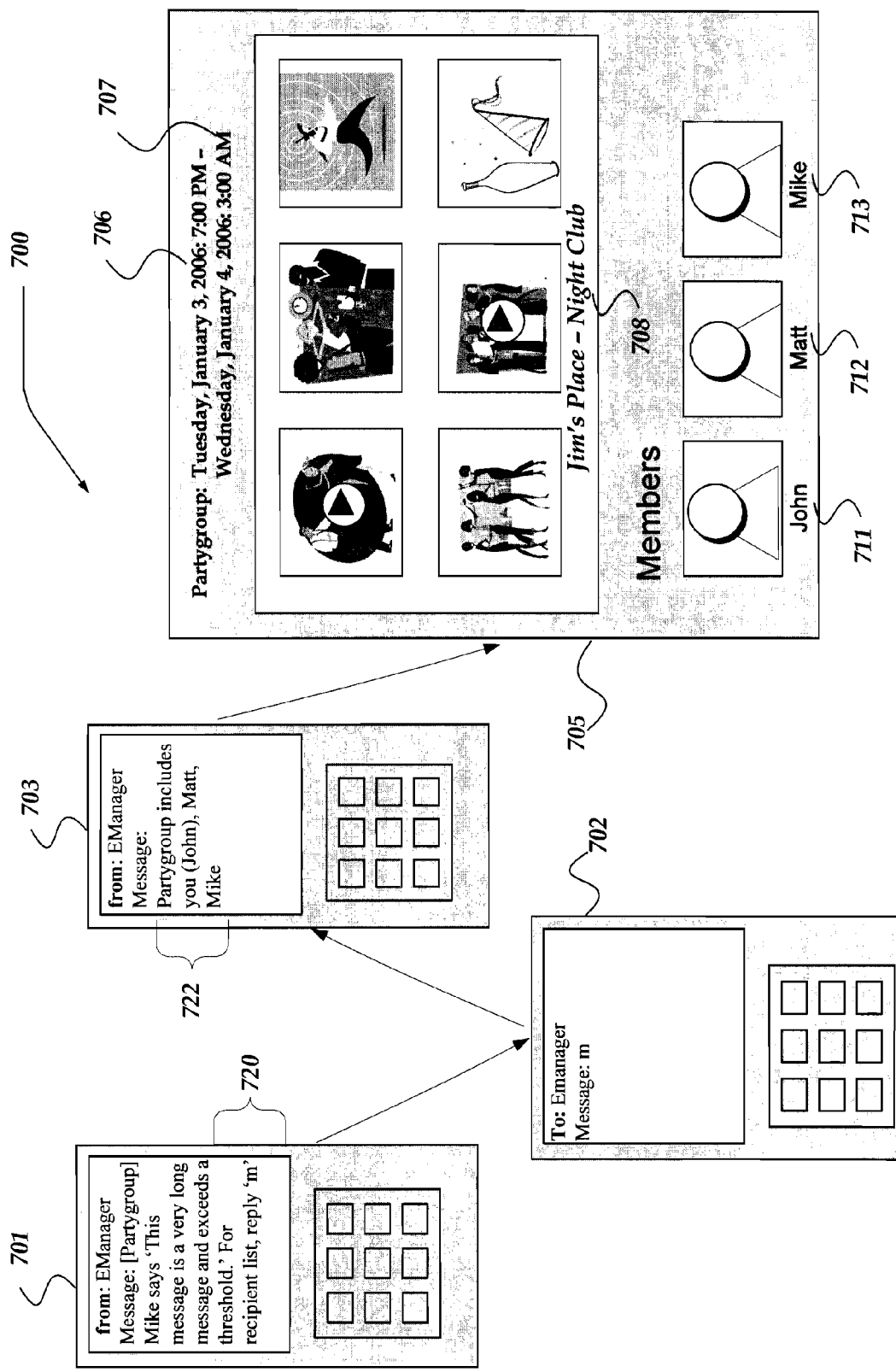
FIG. 7 shows one embodiment of another use case illustrating receiving a recipient list within a message sent to members of a group associated with an event.

In one embodiment, mobile devices 102-104 may send a message to the members associated with an event. In one embodiment, a recipient list or a selectable option to retrieve the recipient list may be automatically added to the sent message. In one embodiment, the recipient list may be determined based on the identity of the user of at least one of mobile devices 102-104; associations between members of previous, present, and future events; or the like. FIGS. 6-7 below include one embodiment of examples of sharing messages which include the recipient list or the selectable option for returning the recipient list.

Mobile devices 102-104 may also communicate with non-mobile client devices, such as client device 101, or the like. In one embodiment, such communications may include providing information about the content to a user of client device 101, or the like.

Client device 101 may include virtually any computing device capable of communicating over a network to send and receive information, including social networking information, or the like. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared content, and to annotate the content, add additional content, or the like. Similar to mobile devices 102-104, client device 101 may be configured to send and receive a message which includes a recipient list or a selectable option to retrieve the recipient list.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple ESS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between ESS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ESS 106 is described in more detail below in conjunction with FIG. 3. Briefly, however, ESS 106 may include any computing device capable of connecting to network 105 to enable determination (e.g. creation and/or modification) of a user's social network based on event characteristics.

ESS 106 may be configured to create an event group and to share content with the members of the group. ESS 106 may receive from various participants in the event, content, and other social networking information, including information associated with event, messages, or the like. ESS 106 may then employ any of a variety of communication services to enable the messages to be shared between the members of the group. Moreover, ESS 106 may enable a website or other location for storage and access of at least some of the shared messages. ESS 106 further enables members of the group to add more members to the group, even if the member adding is not the original creator of the group.

ESS 106 may be further configured to determine at least one characteristic for at least one event. The event may include past, present, or future events. ESS 106 may be configured to determine implicit event characteristics, such as a start time, end time, or location of an event based on the sharing of at least one message.

ESS 106 may receive the message to be communicated within a group associated with an event. ESS 106 may determine a recipient list for the message based on the identities of at least one member in the group. ESS 106 may also determine ordering information based on at least one characteristic of the event or other events. ESS 106 may modify the recipient list based on the ordering information, on a length of the recipient list, a length of the message, or the like. ESS 106 may further modify the message by including information configured to provide the recipient list. ESS 106 may send the modified message to each member of the group, including one of mobile devices 102-104 and/or client device 101 over network 105, or the like. ESS 106 may employ a process similar to that described below in conjunction with FIGS. 4-5 to perform at least some of its actions.

Devices that may operate as ESS 106 include personal computers desktop computers, multiprocessor systems, microprocessor-based or programmable consumer electronics, network PCs, servers, and the like.

Although FIG. 1 illustrates ESS 106 as a single computing device, the invention is not so limited. For example, one or more functions of ESS 106 may be distributed across one or more distinct computing devices. For example, determining associations between group and/or event characteristics, determining recipient lists for shared messages, managing various social networking events, including sharing of content, managing Instant Messaging (IM) session, SMS messages, email messages, posting of content, determining implicit information such as start/end times, locations, or the like for an event, may be performed by a plurality of computing devices, without departing from the scope or spirit of the present invention.

Illustrative Client Environment

Figure 2:
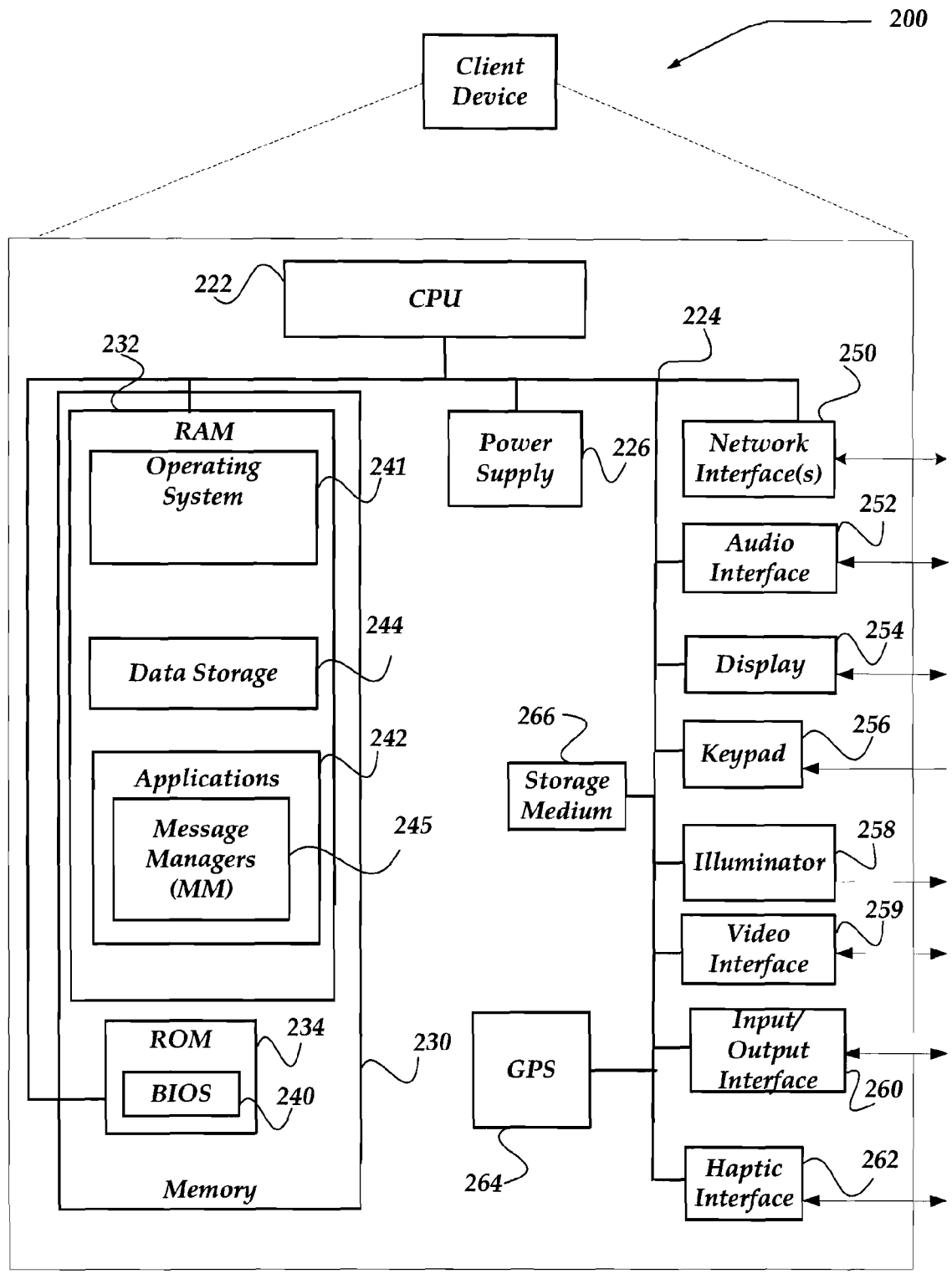
FIG. 2 shows one embodiment of a client device that may be included in a system implementing one or more embodiments of the invention.

FIG. 2 shows one embodiment of client device 200 that may be included in a system implementing one or more embodiments of the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that can be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store content and/or social networking information including text messages, address books, group member lists, or the like. At least a portion of the content and/or event information may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245.

MM 245 represents any of a variety of applications configured to transmit, receive, and/or otherwise process messages and other network content, including, but not limited to SMS, MMS, IM, email, VoIP, browsers, or the like, and to enable telecommunication with another user of another networked device. For example, MM 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MM 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MM 245 may be configured to employ a SIP/RTP to integrate IM/VoIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other content may be communicated between client device 200 and another networked device.

In any event, any one or more of the messaging applications within MM 245 may be employed to enable a user of client device 200 to create a group with members for an event, to share content, and other messages with members of the group, and to access content or the like, from another networked device, such as a website, server, or the like. In one embodiment, MM 245 may enable a user to send SMS messages, and/or send/receive MMS messages, where the messages may include content, a link to a remote server where the content is stored, or the like. In one embodiment, a recipient list or a selectable option to retrieve the recipient list may be automatically added to the sent message. In one embodiment, the recipient list may be determined based on the identity of the user of client device 200.

Illustrative Server Environment

Figure 3:
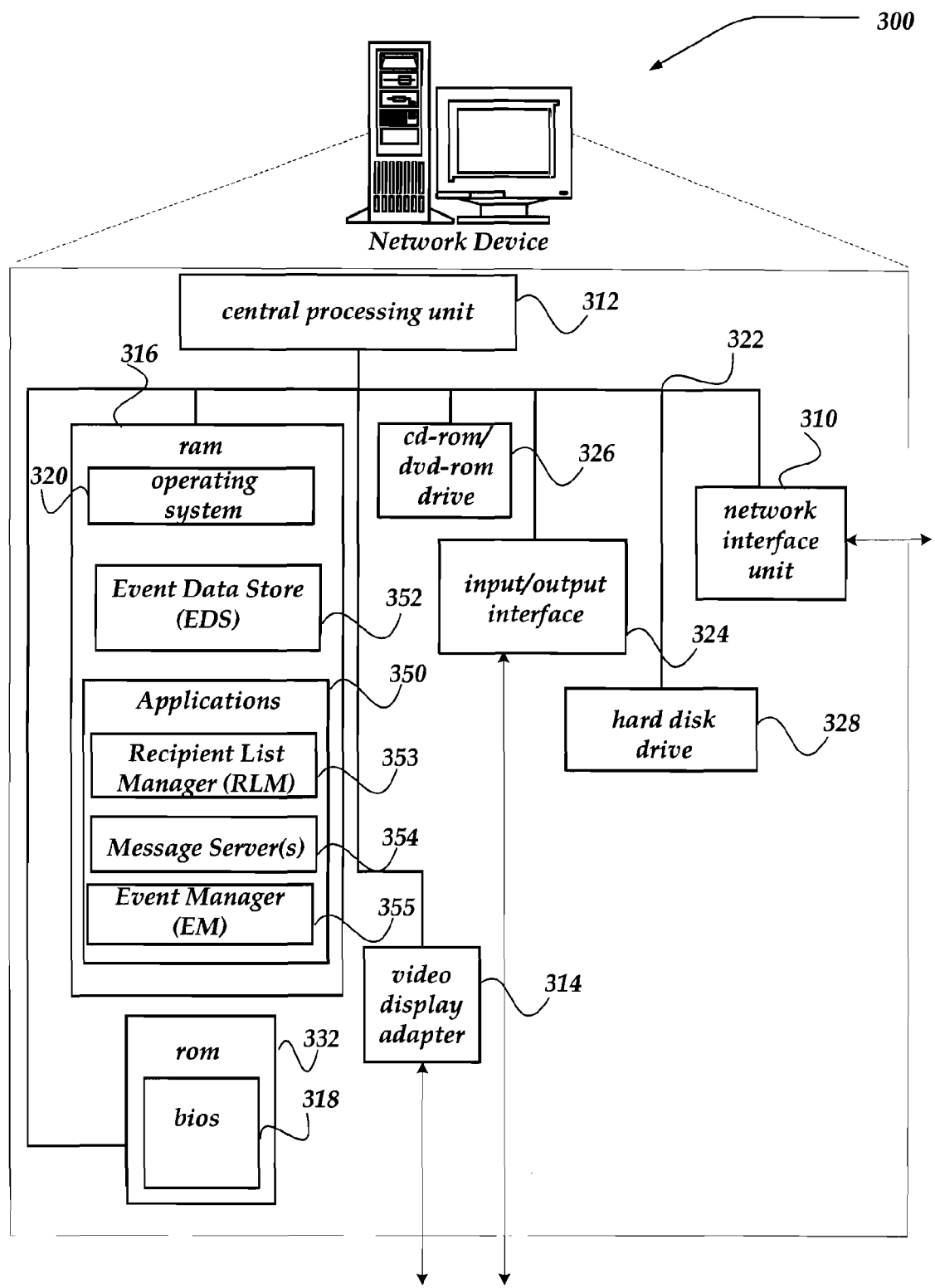
FIG. 3 shows one embodiment of a network device that may be included in a system implementing one or more embodiments of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, ESS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, including XmlHTTPRequest (XHR), Asynchronous JavaScript and XML (AJAX), JavaScript Object Notation (JSON) programs, customizable user interface programs, IPSec applications, encryption programs, security programs, account management, and so forth. Event Manager (EM) 355 and/or Message Servers 354 may also be included as application programs within applications 350.

Event Data Store (EDS) 352 stores a plurality of received content. In one embodiment, EDS 352 may be a database, a file structure, or the like. EDS 352 may store event characteristics, including a time of an event, a location of an event, an amount of activity during the event, content associated with the event, or the like. EDS 352 may store unique IDs for all users associated with an event, or the like. In one embodiment, EDS 352 may store table 800 of FIG. 8.

Message server(s) 354 include virtually any communication server that may be configured to enable communications between networked devices, including email servers, Simple Mail Transfer Protocol (SMTP) servers, Short Message Peer-to-Peer Protocol (SMPP) servers, SMS servers, various text messaging servers, VoIP servers, IM servers, MMS servers, RSS servers, audio servers, web servers, or the like. Message server(s) 354 may employ EDS 352 to store or otherwise manage content that may be communicated over a network. In one embodiment, various message server(s) 354 may receive a message from one network device, and, in conjunction with Event Manager (EM) 355, employ information about group membership to store, and/or share the content to other members over the network. In one embodiment, message server(s) 354, in conjunction with EM 355, store received content for a group, within EDS 352.

EM 355 is configured to manage events. As such, EM 355 may receive from message server(s) 354 a request for creation, deletion, or modification of a group for an event. EM 355 may employ EDS 352, to create and otherwise manage the membership to the group. EM 355 may further employ various message server(s) 354 to send a message to the members of the group indicating that they are a member of the group.

Moreover, EM 355 may be configured to determine at least one characteristic for at least one event. EM 355 may be configured to receive the event characteristics from a user, over network interface unit 310, or the like. While message server(s) 354 may be configured to manage and enable sharing of messages, including messages having content, EM 355 may employ the messages, and related information to determine implicit event characteristics of an event. Thus, EM 355 may determine start times, end times, locations of an event, or the like. EM 355 may store the derived implicit or received event characteristics within an association. EM 355 may also store identities of members with or associated with the characteristics. Referring briefly to table 800 of FIG. 8, event characteristics 862-865 may include implicitly or explicitly determined characteristics and/or each event characteristics 862-865 may associated with a member.

Recipient List Manager (RLM) 353 is configured to determine a recipient list for a message to be communicated between members of a group associated with an (current) event. RLM 353 may receive the identities of the members of the group from EM 355. RLM 353 may receive from EM 355 at least one event characteristic for at least one event, including the current event. Based on the received at least one event characteristic, RLM 353 may modify the recipient list. RLM 353 may also add the determined recipient list or a selectable option to retrieve the recipient list to the message and may provide the added/modified message to message server(s) 354 for delivery to the members of the group.

Generalized Operation

Figure 4:
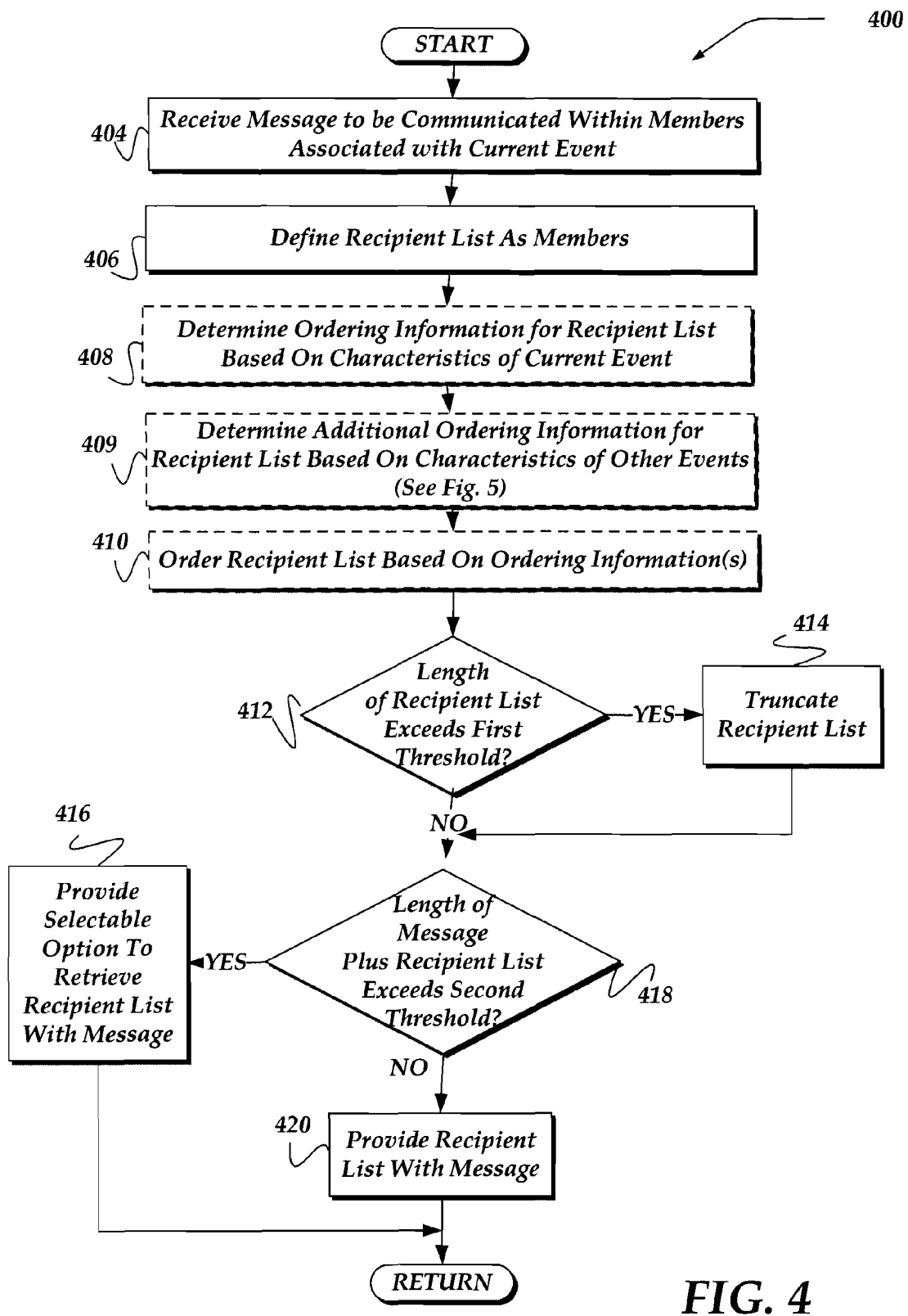
FIG. 4 illustrates a logical flow diagram generally showing one embodiment of a process for determining a recipient list for a message for members of a group associated with an event.
Figure 5:
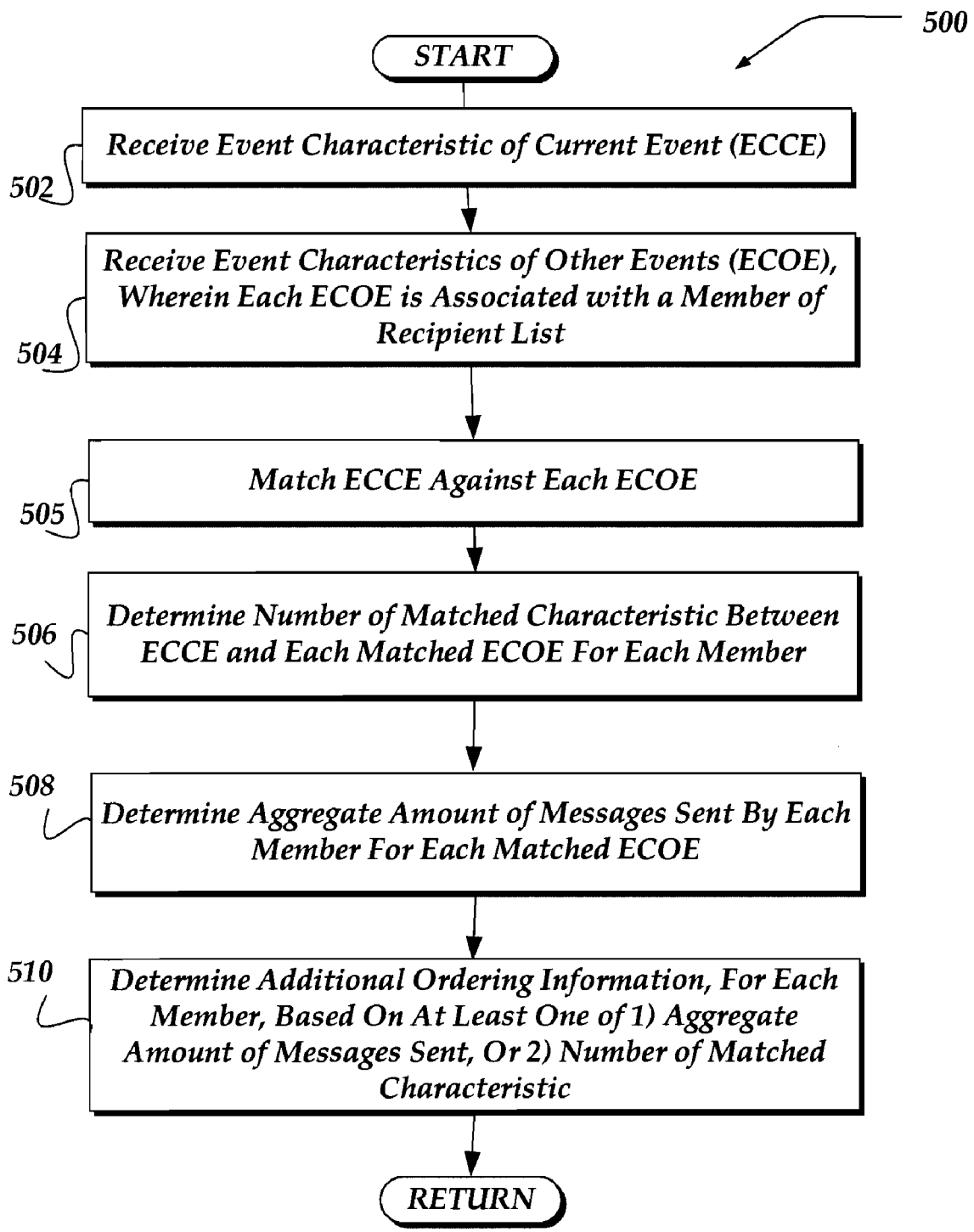
FIG. 5 illustrates a logical flow diagram generally showing one embodiment of a process for determining additional ordering information used to order a recipient list.

The operation of certain aspects of the invention will now be described with respect to FIGS. 4-5. FIGS. 4-5 provide logical flow diagrams of certain aspects, while FIGS. 6-7 provide use case examples to further illustrate the invention.

FIG. 4 illustrates a logical flow diagram generally showing one embodiment of a process for determining a recipient list for a message for members of a group associated with an event. Process 400 may also be performed by ESS 106 of FIG. 1.

Process 400 begins, after a start block, at block 404, where a message to be communicated within a plurality of members/group associated with an event is received. The message may be an SMS, email, IM message, or the like. In one embodiment, the message includes an IM message, an email message, an SMS message, or the like. Processing next flows to block 406.

At block 406, a recipient list for the message is defined, or otherwise determined, based on identities of the plurality of members (in the group). For example, the recipient list may be defined to include user IDs of the plurality of members. The plurality of members, and thus the recipient list may initially be ordered based on a time a particular member was added to the group, a status of a member (e.g. whether a member is a creator of the event), or the like. As an example, given an event A with the members "John", "Mike," and "Matt," the recipient list may be ("John", "Mike", "Matt").

Processing next continues to block 408, where a first ordering information is determined for the recipient list based on characteristics of the event. In one embodiment, the first ordering information of the recipient list may be based on a time when a member in the recipient list joined the event. In this embodiment, the first ordering information may specify that the list is be sorted in chronological order, reverse chronological order, or the like. As an example, if in the event A, the members joined in the order, "Mike", "John," "Matt," then the ordering information may specify that "Mike" is ordered before "John," and "John" before "Matt."

In another embodiment, the first ordering information of the recipient list may be based on the amount of messages sent by a member associated with the event. In this embodiment, the first ordering information may specify that the list is be sorted such that a member who has sent more messages appears higher in the list.

Processing next continues to block 409, where additional ordering information are determined for the recipient list based on another characteristic of another event, wherein the other event includes at least one of the plurality of members from the group. The other event may be past events occurring before the event, present events occurring concurrently with the event, or future events scheduled to occur after the event. One embodiment of a process for performing block 409 is described in conjunction with FIG. 5. Briefly, however, at block 409, the additional ordering information are determined based on each member of the recipient list's activities in the other events are determined. The additional ordering information may be based on a matching score between the characteristic and the other characteristic, an aggregate amount of messages sent by the member are determined for the other characteristic, or the like. For example, referring briefly to table 800, "Mike" has an average aggregate amount of messages sent of 8, "Matt" has an average aggregate amount of 9, and "John" has an average aggregate amount of 3.5 (e.g. (2+5)/2). Accordingly, in this example, the additional ordering information may specify that "Matt" is ordered before "Mike," and "Mike" before "John."

Referring back to process 400, processing next continues to block 410, where the recipient list is ordered based on the first ordering information and/or the additional ordering information. In one embodiment, the recipient list may be ordered based on a combination of the first ordering information and the additional ordering information. For example, on the first ordering information and the additional ordering information may be combined by a weighted sum, or the like. In one embodiment, the first ordering information may be given more weight. In any case, based on the first ordering information and/or the additional ordering information, the recipient list is modified, such that members with higher scores, or the like, are ordered higher in the recipient list. For example, in the case where only the first ordering information is used, the recipient list may be changed from ("John", "Mike", "Matt") to ("Matt", "Mike", "John").

In an alternate embodiment, members with ordering information indicating identical ordering may be ordered by any other ordering mechanism, including alphabetical ordering. For example, if "John" and "Mike" both sent 8 messages, "John" may appear before "Mike" in the recipient list based on an alphabetical ordering.

In an alternate embodiment, ordering of the recipient list may not be required because the recipient list defined at block 406 may already be ordered, and thus blocks 408, 409, and 410 may be optional and may not be performed. For example, at block 406, a list of members associated with the group may already be ordered by chronological order. In this embodiment, the recipient list may keep the ordering of the list of members.

Processing next continues to decision block 412, where it is determined whether a length of the recipient list exceeds a first threshold. If the length of the recipient list exceeds or is greater than or equal to the first threshold, then processing continues to block 414, where the recipient list is truncated. The list may be truncated to within a particular number of recipients, or the like. This particular number may be defined by an administrator, the user, dynamically determined based on a capability of a mobile device receiving the recipient list, or the like. For example, for the recipient list ("Matt", "Mike", "John"), the list may be truncated to two members ("Matt", "Mike"). Processing then continues to decision block 418. If at decision block 412, the length of the recipient list does not exceed or is not greater than or equal to the first threshold, processing continues to decision block 418.

At decision block 418, it is determined whether the length of the message plus the length of the recipient list exceeds a second threshold. The threshold may be pre-defined, dynamically determined based on a capability of a mobile device receiving the message plus the recipient list, or the like. The threshold may represent a character length. If the length of the message plus the length of the recipient list exceeds or is greater than or equal to the second threshold, then processing continues to block 416. Otherwise, processing continues to block 420.

At blocks 416 and 420, access to the ordered recipient list is provided with the message. In one embodiment, information configured to provide the ordered recipient list is provided with the message. In one embodiment, the message may be provided/sent to a plurality of client devices, wherein each device of the plurality of client devices is associated with a different member of the plurality of members associated with event. In one embodiment, the information configured to provide the ordered recipient list includes a portion of a Short Message Service (SMS) message, a portion of an Instant Message (IM) message, a Wireless Application Protocol (WAP) link to enable retrieving the recipient list, or the like. In one embodiment, the same recipient list is provided to every one of the plurality of client devices. In another embodiment, the recipient list may be modified for each of the different member. Each of the recipient list may be modified to place the receiver of the message at the beginning of the list.

Specifically, at block 416, the information is a selectable option to retrieve the recipient list. Accordingly, the selectable option to retrieve the recipient list is provided with the message. In one embodiment, the selectable option includes a text message indicating that a particular key is to be pressed to retrieve the recipient list. An example of a text message may be "for recipient list, reply 'm'." In another embodiment, the selectable option includes a Wireless Application Protocol (WAP) link to the ordered recipient list. The selectable option may be added (e.g. concatenated, embedded) to the message. The added/modified message may be communicated to members of the group (e.g. recipients) over a network, to each mobile device associated with the members of the group, or the like. Processing then returns to a calling process for further processing.

At block 416, the information is the recipient list. Accordingly, the recipient list is provided with the message. In one embodiment, the recipient list may be added (e.g. concatenated, embedded, appended) to the message. The added message may be communicated to members of the group/recipients over a network, to each mobile device associated with the members of the group/recipients, or the like. Processing then returns to a calling process for further processing.

FIG. 5 illustrates a logical flow diagram generally showing one embodiment of a process for determining additional ordering information used to order a recipient list. Process 500 may also be performed by ESS 106 of FIG. 1.

Process 500 begins, after a start block, at block 502, where at least one event characteristic of a current event (ECCE) is received. An ECCE may include the event's time of creation, or duration, the event's location, the event's name, or the like.

Processing next continues to block 504, where at least one event characteristic of at least one other event (ECOE) is received. An ECOE may include the event's time of creation, or duration, the event's location, the event's name, or the like. Each of the ECOE may also be associated with a member of a recipient list and/or an amount of messages sent by the member. One example of a data structure for storing the ECOE is shown in table 800 of FIG. 8. Row 862 shows an example of event characteristics for an event named "Drinks" occurring at location "John's place" and at time 7:00 pm and which includes at least the members "John" and "Mike." For this event, "Mike" sent 8 messages.

Processing next continues to block 505, where the ECCE is matched against each ECOE. A matching may be a complete match, a partial match, or the like. For example, the event A may occur at time 7:00 pm at location "John's Place" and may be entitled "Drinks." The event A's characteristics may match row 862 and row 865's event time field, event location field, and event name field. The event A may match row 863's event time's field because event A's time is within row 863's event time field's range. The event A may match none of the fields of row 864.

Processing next continues to block 506, where a number of matched characteristics between the ECCE and each matched ECOE is determined for each member. The amount of match may represent how related a member is to the current event based on whether the member has been in other events with similar characteristics as the current event. For example, event A may match row 862 (for "Mike") of table 800 at a score of 1.0 (e.g. 100%) because event A matches all three of row 862's fields. The event A's characteristics may match row 863 (for "Matt") at a score of 0.33 (e.g. a score of 33%) because only one of row 863's three fields match event A's characteristics. Event A may match row 865 (for "John") at a score of 1.0, but may match row 864 (for "John") at a score of 0.0. So, for member "John," the score may be averaged to be 0.5. The amount of match for each member is: Mike: 1.0, John: 0.5, Matt: 0.33. Accordingly, this match may represent how related each of the members are to the current event.

Processing next continues to block 508, where an aggregate amount of messages sent by each member of the recipient list is determined, for each matched ECOE. The aggregate amount may be a sum, an average, or the like. Referring briefly to table 800, an aggregate amount for each member is determined as: "Mike": 8, "Matt": 9, and "John": 5. In another embodiment, aggregate amount of messages sent by each member of the recipient list is determined, for every ECOE (whether matched or not to the ECCE).

Processing next continues to block 510, where the additional ordering information is determined based at least on one of 1) the determined aggregate amount of messages or 2) the determined amount of matches for each member, or a combination of the two.

In one embodiment, the additional ordering amount may be based on the aggregate amount of messages alone. For example, for the following aggregate amounts of messages, Matt: 9, Mike: 0.8, John: 3.5, the additional ordering information may specify that "Matt" is to be ordered before "Mike," and "Mike" before "John."

In one embodiment, the additional ordering amount may be based on the amount of match alone. For example, for the following amount of matches, Mike: 1.0, John: 0.5, Matt: 0.33, the additional ordering information may specify that "Mike" is to be ordered before "John," and "John" before "Matt."

In another embodiment, the additional ordering information may be based on a combination of the amount of match and the aggregate amount. For example, the additional ordering information may be based on a product of the amount of match and the aggregate amount. As an example, the combination of the amount of match and the aggregate amount may be for Mike: 8.0 (8*1), Mat: 2.97 (9*0.33), and "John": 1.75 (3.5*0.5). Thus, the additional ordering information may specify that "Mike" is to be ordered before "Matt," and "Matt" before "John." In any case, the additional ordering information may be used by, for example, block 410 of FIG. 4 to order the recipient list. Processing then returns to a calling process for further processing.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Cases

FIG. 6 shows one embodiment of a use case illustrating receiving a recipient list within a message sent to members of a group associated with an event. While example 600 shows the action to be performed on the selected member as adding the member to an event, any another action may be enabled, such as enabling an SMS, email, or IM communication between the user and the selected member, without departing from the spirit of the invention.

Interface 601 of example 600 illustrates that, in one embodiment, a message to create an event may be sent to an event sharing server (ESS) such as ESS 106 of FIG. 1, or the like. The message may, in one embodiment, employ SMS, however, the invention is not so limited, and any of a variety of communication message services may also be employed. As shown, at interface 601, the user may request a "new" event to be created by the name "partygroup." The user may then be added to the "partygroup" event. After receiving the request to create the event, the ESS may determine at least one event characteristic. The ESS may also determine that the user (e.g. "John") is a member of the group associated with event.

At interface 602, the user receives an instruction on how to add other members to the group associated with the event.

At interface 603, the user adds a member associated with the phone number "4155551234," and another member associated with the identifier "Mike." "4155551234" may be associated with the member "Matt." After receiving the request to add the members, the ESS may determine that "Mike" and "Matt" are members of the group.

At interface 604, the user sends a message to all members in the group. In one embodiment, the message may be sent to the ESS for delivery to all members in the group. Interface 604 illustrates an embodiment of a possible communication from a user that might transpire during block 404 of FIG. 4. After receiving the message "Hey guys!" the ESS may determine recipient list 610 using process 400.

Interface 605 shows the message received by the user, associated with the identifier "John." Recipient list 610 is added to the message. In one embodiment, recipient list 610 may also indicate the receiver of the message (e.g. "you (John)"). Although not shown, the message with recipient list 610 may also be truncated, ordered, or the like.

FIG. 7 shows one embodiment of another use case illustrating receiving a recipient list within a message sent to members of a group associated with an event. Example 700 of FIG. 7 is a continuation of example 600 of FIG. 6.

Interface 701 shows another message received by a plurality of members (recipients) of the group associated with the event. As shown, the message of interface 701 exceeds a threshold. Thus, selectable option 720 to retrieve the recipient list is included with the message. At interface 702, the user selects the option. At interface 703, recipient list 722 is provided to the member. The recipient list may be ordered and/or truncated. In one embodiment, the recipient list may also indicate the receiver of the message (e.g. "you(John)").

Interface 705 shows another user interface for displaying the recipient list, including recipients 711-713. As shown, interface 705 provides richer content than interface 703. Interface 703 may provide multimedia avatars to represent the members of the recipient list.

In one embodiment (not shown), at interface 701, selectable option 720 may be a WAP link, which when selected, provides interface 705. In another embodiment, the user may access interface 705 from a web page, or the like. Also, interface 705 shows determined event characteristics, including start time 706, end time 707, location 708, and shared media associated with the event. These determined event characteristics may be used to determine the ordering information in block 408 of FIG. 4 and the additional ordering information in process 500 of FIG. 5, for example.

Illustrative Data Structure

FIG. 8 shows one embodiment of a datastore for storing event characteristics. Table 800 may be stored in EDS 352 of FIG. 3. Table 800 may be used to match against a current event and to provide additional ordering information, as described in process 500 of FIG. 5, for example.

As shown, each one of rows 860-865 include a member field, a message sent by the member field, and a plurality of event characteristic fields, including an event time field, event location name field, and an event name field. At least some fields may be empty. An empty field may represent a field that matches any value.

Table 800 may include many more fields than those shown. For example, table 800 may include other event characteristic fields, including a priority of an event, a status of the event as public or private, a type o the event, or the like. The fields shown, however, are sufficient to disclose an illustrative embodiment for practicing the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on a processor of managing a communication over a network by performing actions, comprising:
   receiving a message to be communicated within a plurality of members associated with an event, the event being a current physical gathering of members in the plurality of members;
   after receiving the message, determining a recipient list for the received message based on identities of the plurality of members, wherein the determined recipient list has an initial order;
   after determining the recipient list, determining ordering information for the recipient list based on at least one characteristic of the event;
   re-ordering the recipient list based on the determined ordering information; and providing with the message, access to the ordered recipient list;
   determining additional ordering information for the recipient list based on other characteristics of other events, wherein the other events include at least one of the plurality of members, and wherein re-ordering the recipient list is further based on the additional ordering information; and
   wherein determining the additional ordering information is based at least on one of:
      an aggregate amount of messages sent by each of the plurality of members, for each of the other events, or
      a number of matched characteristics between the at least one characteristic and the other characteristics.

2. The method of claim 1, further comprising:
   truncating the recipient list at a threshold number of recipients if a length of the recipient list exceeds the threshold, and wherein the information configured to provide the ordered recipient list is based on the truncated recipient list.

3. The method of claim 1, wherein providing with the message, access to the ordered recipient list further comprises:
   providing with the message, a selectable option to retrieve the ordered recipient list, if a length of the message plus a length of the recipient list is equal to or greater than a threshold; and
   providing with the message, the ordered recipient list, if a length of the message plus a length of the recipient list is less than the threshold.

4. The method of claim 1, wherein providing with the message comprises:
   sending the message and the information to a mobile device associated with one of the plurality of members.

5. The method of claim 1, wherein the event includes a physical social gathering of people.

6. A network device of managing a communication over a network, comprising:
   a transceiver to send and receive data over the network; and
   a processor that is operable to perform actions, comprising:
      receiving a message to be communicated within a group associated with an event, the event being a current physical gathering of members of the group;
      after receiving the message, determining a recipient list for the received message based on the group, wherein the determined recipient list has an initial order;
      truncating the recipient list if a length of the recipient list exceeds a threshold; and
      after determining the recipient list, determining ordering information for the truncated recipient list based on at least one characteristic of the event;
      re-ordering the truncated recipient list based on the determined ordering information;
      providing the message and information configured to provide the truncated recipient list, to a plurality of client devices, wherein each device of the plurality of client devices are associated with a different one of a plurality of members of the group;
      re-ordering the truncated recipient list based on characteristics of other events, wherein every one of the other events includes at least one of the plurality of members, wherein the other events includes at least one of a past event occurring before the event, a present event occurring concurrently with the event, or a future event scheduled to occur after the event, and
   wherein the information configured to provide the truncated recipient list is based on the ordered and truncated recipient list.

7. The network device of claim 6, wherein the information configured to provide the ordered recipient list includes a portion of a Short Message Service (SMS) message, a portion of an Instant Message (IM) message, or a Wireless Application Protocol (WAP) link to enable retrieving the recipient list.

8. A system for managing a communication over a network, comprising:
   at least one processor;
   an event manager operable on the at least one processor to perform actions comprising:
      determining event characteristics for a plurality of events, wherein the plurality of events includes a current event;
      providing at least one of the event characteristics to a recipient list manager;
   a message server operable to perform actions comprising:
      receiving a message to be communicated within a group associated with the current event, the event being a current physical gathering of members of the group;

receiving from the recipient list manager, access to the recipient list; and providing with the message, the access to the recipient list, the recipient list manager operable to perform actions comprising:

after receiving the message, determining the recipient list for the received message based on a plurality of members in the group, wherein the determined recipient list has an initial order;

after determining the recipient list, determining ordering information for the recipient list based on the at least one provided characteristic of the event;

re-ordering the recipient list based on the determined ordering information; and sending to the message server, the access to the recipient list;

determining additional ordering information for the recipient list based on other characteristics of other events, wherein the other events include at least one of the plurality of members, and wherein re-ordering the recipient list is further based on the additional ordering information; and wherein determining the additional ordering information is based at least on one of:

an aggregate amount of messages sent by each of the plurality of members, for each of the other events, or a number of matched characteristics between the at least one characteristic and the other characteristics.

9. The system of claim 8, further comprising:

a mobile device associated with at least one of the plurality of members and operable to perform actions comprising:

receiving the message from the message server; and retrieving the recipient list based on a selectable option.

10. The system of claim 8, wherein the recipient list manager is further operable to perform actions, comprising:

truncating the recipient list, before sending to the message server, if a length of the recipient list exceeds a threshold.

11. The system of claim 8, wherein the message includes an Instant Messaging (IM) message, an email message, or an Short Messaging Service (SMS) message.

12. A non-transitory processor readable medium having processor executable instructions for managing a communication, over a network, the processor executable instructions configured to enable a processor to perform actions, comprising:

receiving a message to be communicated within a group associated with an event, the event being a current physical gathering of members of the group;

after receiving the message, determining a recipient list for the received message based on identities of a plurality of members in the group, wherein the determined recipient list has an initial order;

after determining the recipient list, determining ordering information for the recipient list based on at least one characteristic of the event;

re-ordering the recipient list based on the determined ordering information; and adding information configured to provide the recipient list to the message;

determining additional ordering information for the recipient list based on other characteristics of other events, wherein the other events include at least one of the plurality of members, and wherein re-ordering the recipient list is further based on the additional ordering information; and wherein determining the additional ordering information is based at least on one of:

an aggregate amount of messages sent by each of the plurality of members, for each of the other events, or a number of matched characteristics between the at least one characteristic and the other characteristics.

13. The non-transitory processor readable medium of claim 12, wherein the information configured to provide the recipient list comprises at least one of a selectable option to retrieve the recipient list if a length of the message plus the recipient list exceeds a threshold, or the recipient list.

14. The non-transitory processor readable medium of claim 12, wherein the actions further comprises:

providing the message with a truncated version of the recipient list if a length of the recipient list exceeds a threshold.

15. A mobile device for managing a communication over a network, comprising:

a transceiver to send and receive data over the network; and a processor that is operable to perform actions, comprising:

sending a request to add a member to a group associated with an event, wherein the member is a user of the mobile device, the event being a current physical gathering of members of the group;

receiving a message to be communicated within the group, wherein the message includes information configured to provide a recipient list for the received message, and wherein the recipient list includes at least one other member of the group; and retrieving the recipient list based on the information included in the received message, wherein the recipient list is re-ordered based on at least one characteristic of the event;

determining additional ordering information for the recipient list based on other characteristics of other events, wherein the other events include at least one of the plurality of members, and wherein re-ordering the recipient list is further based on the additional ordering information; and wherein determining the additional ordering information is based at least on one of:

an aggregate amount of messages sent by each of the plurality of members, for each of the other events, or a number of matched characteristics between the at least one characteristic and the other characteristics.

16. The mobile device of claim 15, wherein the message is an SMS message.

* * * * *

UNITED STATES PATENT AND TRADEMARK OFFICE
CERTIFICATE OF CORRECTION

PATENT NO. : 8,200,763 B2
APPLICATION NO. : 11/562827
DATED : June 12, 2012
INVENTOR(S) : Michael Quoc et al.

Page 1 of 1

It is certified that error appears in the above-identified patent and that said Letters Patent is hereby corrected as shown below:

On the title page, item (57), in Abstract, in column 2, line 13, after "length" delete "if".

Signed and Sealed this
Seventh Day of August, 2012

David J. Kappos
*Director of the United States Patent and Trademark Office*